Figure 1:
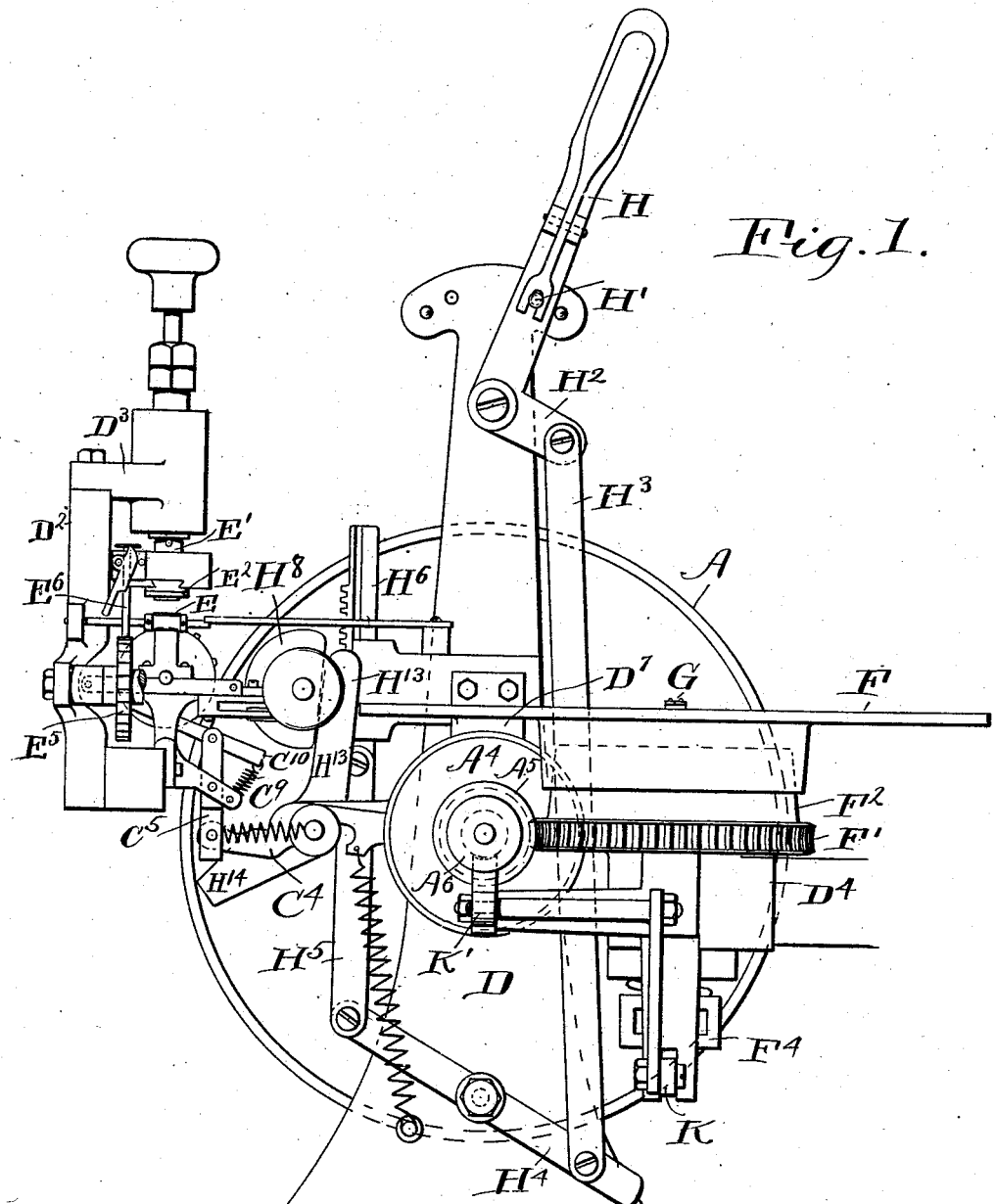

No. 842,435. PATENTED JAN. 29, 1907.
A. H. SUTTON.
MACHINERY FOR MEASURING AND MARKING FABRICS.
APPLICATION FILED OCT. 16, 1905.

6 SHEETS—SHEET 2.

Witnesses.
E. B. Gilchrist
H. R. Sullivan

Inventor
Andrew H. Sutton,
By his Attorneys,
Thurston Bates & Woodward

No. 842,435. PATENTED JAN. 29, 1907.
A. H. SUTTON.
MACHINERY FOR MEASURING AND MARKING FABRICS.
APPLICATION FILED OCT. 16, 1905.

6 SHEETS—SHEET 3.

Witnesses.
E. B. Gilchrist
H. C. Sullivan

Inventor:
Andrew H. Sutton,
By his Attorneys,
Thurlow, Bates & Woodward

No. 842,435. PATENTED JAN. 29, 1907.
A. H. SUTTON.
MACHINERY FOR MEASURING AND MARKING FABRICS.
APPLICATION FILED OCT. 16, 1905.

6 SHEETS—SHEET 5.

Witnesses.
E. B. Gilchrist
H. P. Sullivan

Inventor,
Andrew H. Sutton,
By his Attorneys,
Thurston, Bates & Woodward

No. 842,435. PATENTED JAN. 29, 1907.
A. H. SUTTON.
MACHINERY FOR MEASURING AND MARKING FABRICS.
APPLICATION FILED OCT. 16, 1905.

6 SHEETS—SHEET 6.

UNITED STATES PATENT OFFICE.

ANDREW H. SUTTON, OF NEW YORK, N. Y., ASSIGNOR, BY MESNE ASSIGNMENTS, TO PARKER AND WOOLSON MACHINE COMPANY, OF SPRINGFIELD, VERMONT, A CORPORATION OF VERMONT.

MACHINERY FOR MEASURING AND MARKING FABRICS.

No. 842,435.  Specification of Letters Patent.  Patented Jan. 29, 1907.

Application filed October 16, 1905. Serial No. 282,878.

*To all whom it may concern:*

Be it known that I, ANDREW H. SUTTON, a citizen of the United States, residing at New York city, in the county of New York and State of New York, have invented a certain new and useful Improvement in Machinery for Measuring and Marking Fabrics, of which the following is a full, clear, and exact description, reference being had to the accompanying drawings.

The object of my invention is to provide mechanism whereby fabrics may be mechanically measured and the measurement applied in a useful way to the fabric.

In measuring-machines hitherto used for the purpose of marking the fabric numbers indicating the units of length are printed periodically upon the selvage of the goods as the fabric is fed along. This method of continuously marking has been found objectionable for many reasons known to the trade; and it is one of my objects to provide a machine in which the recording and marking mechanism shall be so placed as to allow the fabric to pass freely through the measuring-machine without marking of any kind, the recording and marking mechanism being meanwhile properly advanced, so that the total number of measured units may be printed on the end of the piece and may be duplicated on a card to be attached to the piece as a tally or check on the quantity sold from that piece. In connection with the above-mentioned recording device I have provided an indicating mechanism whereby the number of units measured from any given point on the fabric may be observed by the operator. The various mechanisms which go to make up these recording and indicating devices are so constructed and arranged in detail that the said devices may be released at will and returned to their initial or zero position.

It has further been my object to improve many of the details of construction incident to this type of machine, as will appear more fully from the description to follow.

Figure 2:
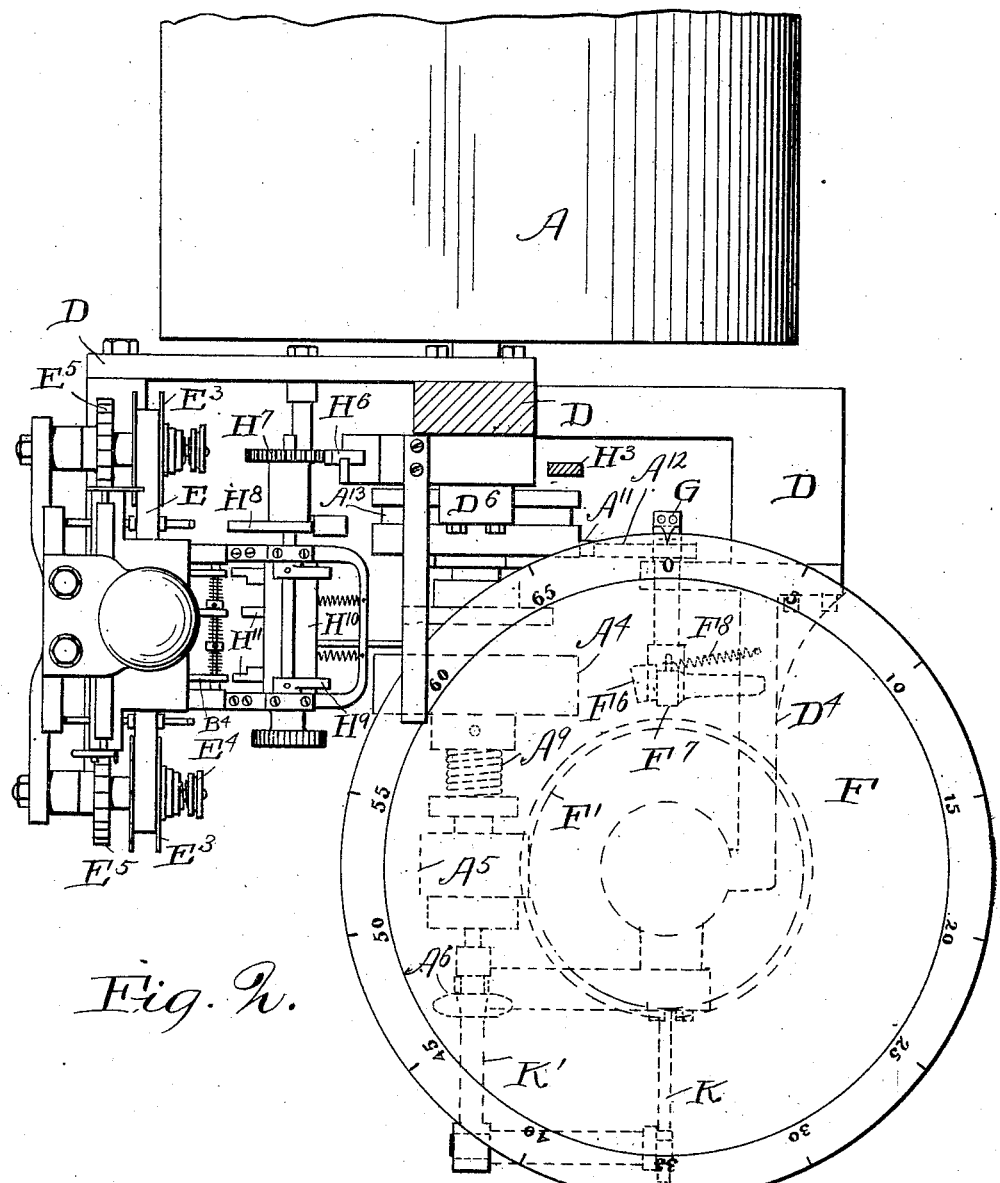
Figure 3:
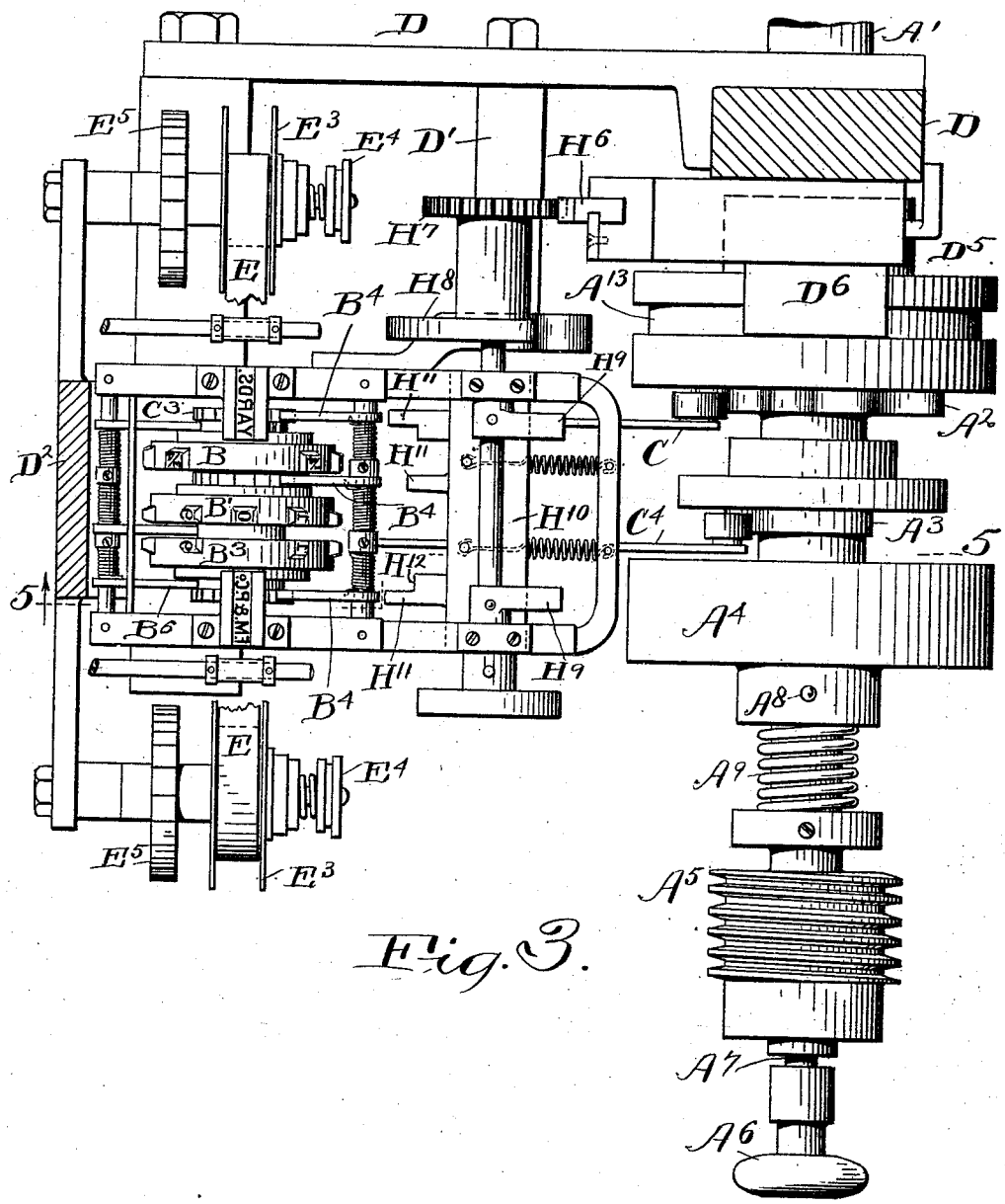
Figure 4:
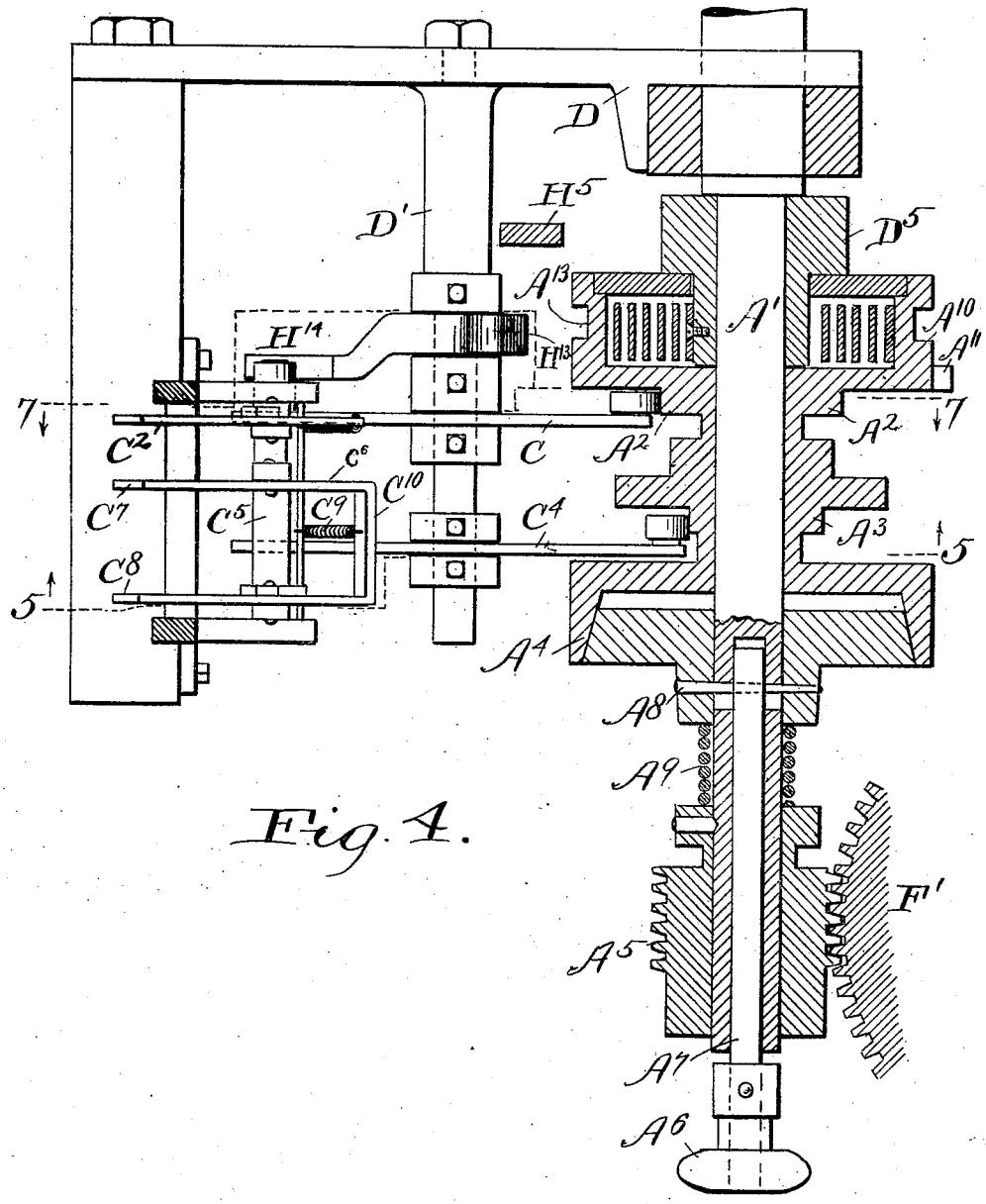
Figures 5, 6:
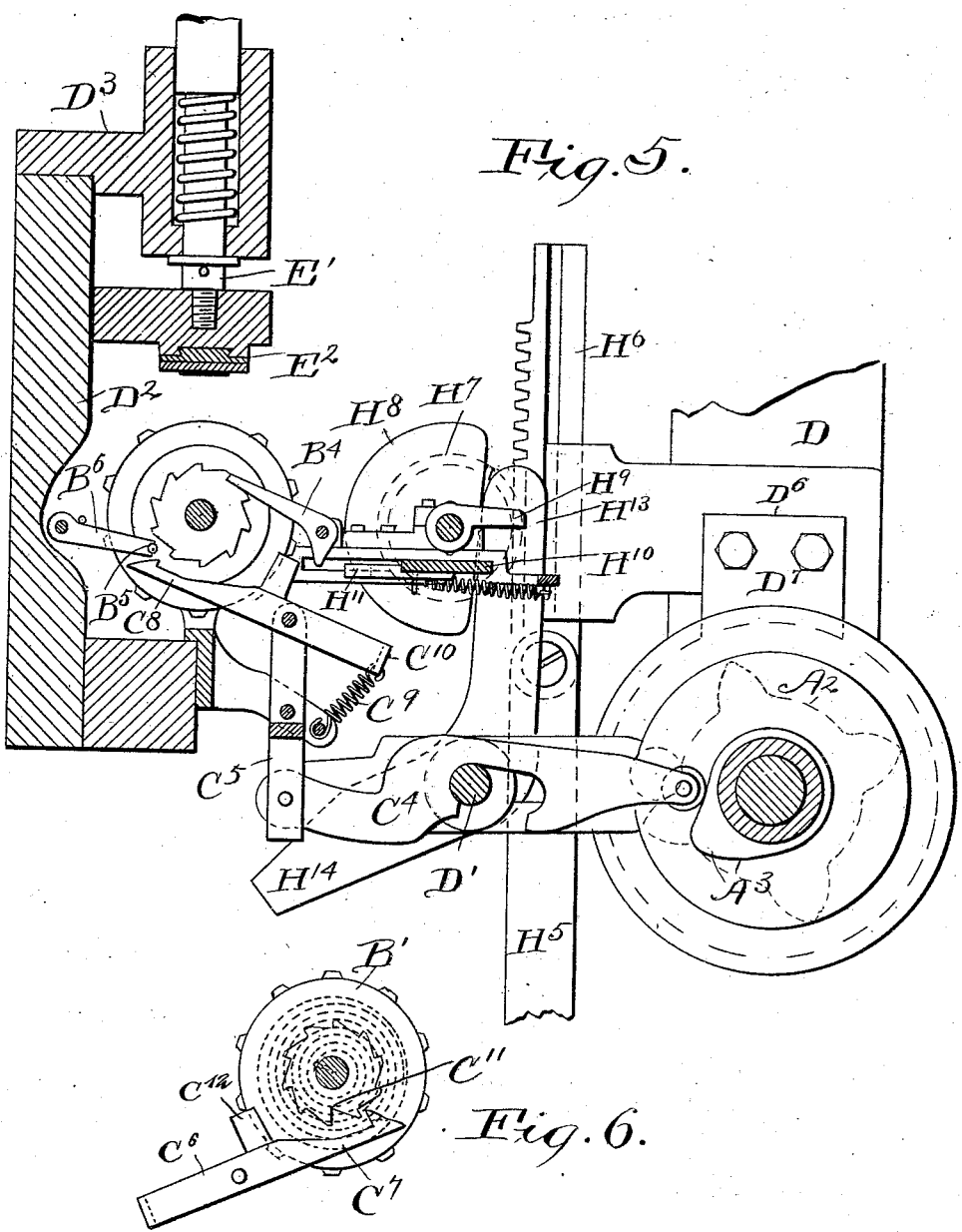
Figure 7:
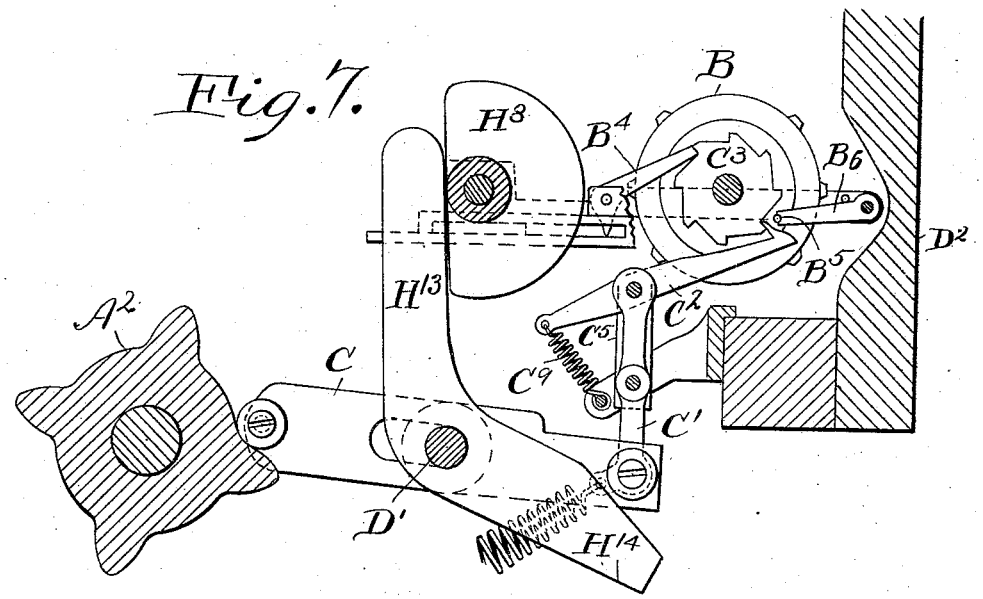
Figure 8:
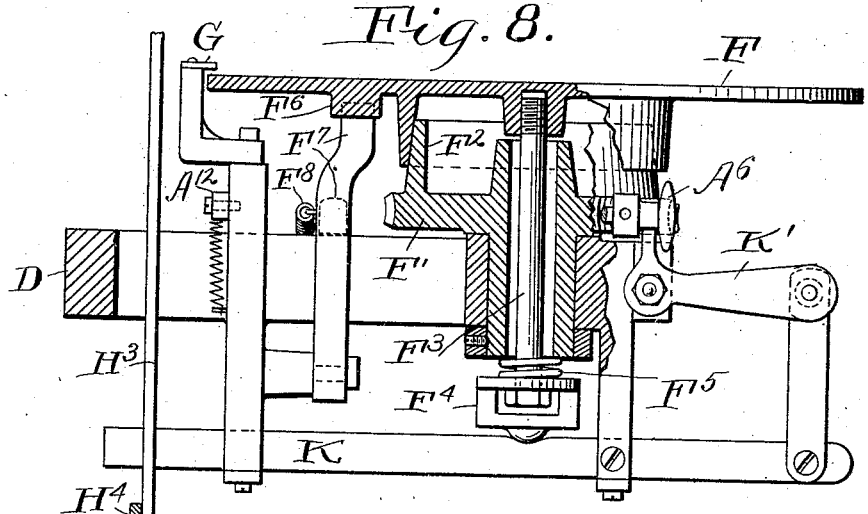

Referring to the accompanying drawings, Figure 1 presents an end elevation of my machine viewed from that end on which the measuring mechanism is located. Fig. 2 is a plan view of the measuring mechanism, the measuring-roll being broken away and certain other parts indicated in dotted lines. Fig. 3 is an enlarged plan of the recording mechanism, the covering-plate and stamping-plunger being removed for the purpose of better illustration. Fig. 4 presents a sectional plan of the operating-shaft, showing details of construction. Fig. 5 is a sectional elevation on the line 5 5 of Figs. 3 and 4 looking in the direction of the arrows. Fig. 6 is a detail showing the pawl-and-ratchet mechanism for advancing the units and tens wheels. Fig. 7 is a vertical sectional detail taken on the line 7 7 of Fig. 4 looking in the direction of the arrows, illustrating the mechanism by which the fraction-recording wheel is advanced. Fig. 8 is a detail in partial vertical section, illustrating the clutch mechanism for advancing the indicating-disk and permitting its return to the initial or zero position.

As is usual in such machines, the cloth is passed over a measuring-drum A of unit circumference fixed to a main operating-shaft A'. The operating-shaft carries two cams $A^2$ $A^3$, loosely mounted thereon, but adapted to be rotated therewith through the action of a cone-clutch $A^4$, which clutch may be thrown into and out of operation in a manner and for a purpose to be subsequently described. One of the cams $A^2$ referred to is intended to operate the lowest, which is generally the fractional, denomination of the recording-wheels and is provided with as many operating-surfaces as the number of actuations which it is desired to impart to this particular recording-wheel B during each complete revolution of the shaft. The second cam is designed to operate and advance the recording-wheels of higher denomination than the one previously referred to and in the instance shown is constructed to operate the units-wheel B', and therefore is constructed to bring one actuating-surface into play during each complete revolution of the shaft A'.

Referring to Fig. 7, it will be seen that the rotation of the cam designed to actuate the lowest or fractional recorder B transmits its motion to the latter through a sliding bar C, mounted on a short rod D', projecting from the frame D. Pivotally connected with the outer end of the sliding arm is a rocking lever C', journaled at an intermediate point on a short shaft projecting from a bracket and carrying a pivotally-supported pawl $C^2$ at its opposite end. The said sliding bar C is maintained in a retracted position by means of a tension-spring attached to the rocking lever $C'$ at one end and to the frame of the machine at the other in such manner that an antifriction-roller secured to one end of the bar constantly bears against the cam-surface $A^2$. As is obvious from the drawing, the rotation of the cam $A^2$ will push the sliding bar C forward and oscillate the rocking lever $C'$ in such manner as to drag the pawl $C^2$ forward. The pawl is so positioned as to be held by a tension-spring in constant engagement with a rack-wheel $C^3$, rigidly secured to the rotatable fraction-recording wheel B, and each forward movement of the pawl consequently advances the said wheel a certain distance, which is determined by the throw of the sliding bar. Spring-pressed dogs $B^4$ $B^4$ are journaled on a shaft in the framework carrying the recording-wheels and are adapted to prevent return movement on the part of the wheels. Thus there is a constant fractional advance of the fraction-recording wheel, which bears as many fraction-recording devices as may be desired, the distribution and numbering thereof obviously being determined by the number of ratchet-teeth and the structure of the actuating-cam. Simultaneously with the rotation of the cam just described the cam designed for the actuation and advancement of the units-wheel $B'$ and the tens-wheel $B^3$ is rotated and once in the course of each complete rotation advances a sliding bar $C^4$, similar to that previously described, but which is shown with a slightly different detail structure for the purpose of assembling, as will be seen by reference to Fig. 5. Pivotally secured to the outer end of this sliding bar $C^4$ is a rocking lever $C^5$, journaled at an intermediate point to a bracket projecting from the frame. The upper end of this rocking lever is forked and carries a pivotally-mounted yoke $C^6$, the outer ends of which yoke are shaped to form pawls $C^7$ $C^8$, adapted to advance the units and tens recording wheels. A tension-spring $C^9$, secured to the cross-bar $C^{10}$ of the yoke and fastened to the frame, tends to hold said pawls against the ratchet-teeth, which are rigidly secured to each of the recording-wheels referred to.

The pawl $C^7$ for operating the units-wheel $B'$ has a longer tooth than that which operates the tens-wheel $B^3$, and by reason of this and the fact that the said pawls are rigidly connected by the yoke $C^{10}$ the tens-pawl is normally kept out of engagement with its co-operating ratchet-teeth. (See Fig. 6.) One of the ratchet-teeth on the units-wheel, however, is so deeply cut as to form a deep notch $C''$, which is designed to allow the yoke to drop down into such position that the tens-pawl also comes into engagement with its ratchet-wheels, thus insuring the advancement of the tens-wheel once during each complete revolution of the units-wheel.

By the structure just described the several recording-wheels are caused to advance in proper order, so that the correct stamping or marking devices mounted thereon are brought into position for stamping the measured length upon the cloth, which stamping may be effected at the will of the operator. The marking is effected by means of a ribbon E, similar to that of a type-writer, which lies across the face of the characters on the periphery of the recorders. Secured to a projecting frame-plate $D^2$ is an overhanging bracket $D^3$, carrying a spring-supported hand-stamp $E'$, which has a platen $E^2$ on the lower end thereof for the purpose of pressing the cloth against the marking-ribbon. The ribbon is wound at each end upon rolls $E^3$ $E^3$, journaled on the frame. These rolls have tension devices $E^4$ and ratchet-wheels $E^5$ of the usual type. Depending from the platen at each end are pawls designed to be thrown into or out of operation with the said ratchet-teeth each independently of the other. The arrangement of these parts is such that upon the depression of the platen the pawl which is in engagement with its ratchet-wheel will upon the return of the platen to its normal position advance said ratchet and its roll a certain distance, thus drawing the ribbon across the recording-wheels so as to present a fresh surface thereof. The two ratchets are arranged to feed the ribbon in opposite directions, so that when one pawl is in engagement the other must be thrown out of engagement. The means of accomplishing this is immaterial to the present invention, and it is not thought necessary to describe the same in detail.

Simultaneously with the advance of the recording devices an indicating-dial F is advanced by means of a worm-gear $A^5$. (Shown in Fig. 4.) The worm is positioned upon the outer end of the main shaft $A'$ and secured thereto in such manner as to rotate therewith. Meshing with the worm is a toothed wheel $F'$, which forms part of or is rigid with a cone-clutch $F^2$, mounted in a bracket $D^4$, projecting from the frame D. Carried by this clutch is the indicating dial or disk F, which has a centrally-depending rod $F^3$ passing through the center of the rotating cone-clutch. The lower end of the said rod carries a spider $F^4$, between which and the lower end of the clutch is a compression-spring $F^5$, designed to pull a cone member on the indicating-dial into close frictional engagement with the cone of the clutch and to cause it to rotate therewith.

The periphery of the indicating-disk is of course marked off in any desired manner designed to give indication of the number of units or frictional parts of cloth carried over the measuring-drum. An index-finger G, secured to the framework of the machine, serves to mark the zero-point.

In order that the recording devices and indicating-disk may at any time within the will of the operator be restored to their initial or zero position, I have devised means for throwing the various parts out of operative connection with the main shaft A', and I provide certain arrangements of springs and detents whereby the recording parts will be automatically thrown to and stopped at the zero-point, as described below.

Secured to the upper end of the main frame is a hand-lever H, provided with a locking-pin H', designed to hold it in position. Rigidly connected with this hand-lever is a short arm $H^2$, from which depends a pivotally-connected link $H^3$, which is attached at its lower end to a rocking lever $H^4$, which in turn carries at its opposite end a second link $H^5$, pivotally attached to the lower end of the rack-bar $H^6$, sliding in a bracket projecting from the frame. Meshed with the said rack-bar $H^6$ and rigidly secured to a shaft journaled in the framework is a pinion $H^7$, designed to be rotated by the reciprocation of said rack-bar. Upon the same shaft with the pinion $H^7$ and likewise rigidly connected therewith is a cam $H^8$ and two rocking arms $H^9$ $H^9$, which arms need not be two in number, but are so shown, since for mechanical reasons such number is preferable. Mounted in the frame and below the shaft on which the rock-arms $H^9$ $H^9$ are secured is a sliding plate $H^{10}$, carrying projecting lugs $H^{11}$ $H^{11}$, adapted to strike against heels on the detent-dogs $B^4$, previously described as preventing backward movement on the part of the recording-wheels. As the rack-bar $H^6$ reciprocates, and thereby rotates the shaft on which the rocking arms $H^9$ are secured, these arms press against the sliding plate $H^{10}$ and advance the latter until the lugs $H^{11}$ carried thereby come in contact with the heels on the detent-dogs $B^4$ and trip the latter, so as to throw them out of contact with the ratchet-teeth on the recording-wheels. Each of these recording-wheels is provided with any suitable internally-wound friction-spring structure tending to throw it backward toward the zero-point, which tendency is normally restrained by both their operating-pawls and the detent-dogs referred to. This return friction-spring is an ordinary mechanical device, being of that type illustrated and described in United States Patent No. 359,579, March 15, 1887, to Sutton and Watson.

Immediately after the tripping of the dogs in the manner just described the pawls for the units and tens wheel are thrown clear of their ratchets by reason of a second lug $H^{12}$ on the sliding plate coming in contact with and moving a projection $C^{12}$ on the yoke $C^{10}$, carrying the said pawls. During this operation the cam $H^8$, mounted on the shaft with the rocking arms, wipes the end of an elbow-arm $H^{13}$, pivotally mounted on the same short shaft which supports the sliding bar $H^{10}$. This elbow-arm has at its extremity a finger $H^{14}$, which bears against a projection on the end of the sliding bar C, which operates the friction-wheel B. Upon the swinging of the elbow-arm this finger so oscillates the rocking arm C', carrying the operating-pawl $C^2$, that the latter is swung so far forward as to clear the ratchet-teeth on the recording-wheel and allow the latter to move backward toward the zero-point under the influence of its fraction-spring. For the purpose of stopping the recording-wheels at said zero-point I have provided each with a pin $B^5$, adapted to be caught by a detent $B^6$ when the zero-point is reached. These detents are held in position by coil-springs secured to the shaft on which the detents are mounted. This arrangement allows the pins $B^5$, projecting from the recording-wheels, to snub the detents $B^6$ out of the way when said wheels are in operation.

From the preceding description it will be seen that the operation of shifting of the hand-lever at the top of the frame will allow each of the recording-wheels to be returned to its initial position at any time desired by the operator. Simultaneously with this action the friction-clutch controlling the rotation of the cams is thrown out of gear, as will appear below. As the hand-lever H is shifted for this purpose one end of the rocking lever $H^4$, pivoted to the lower part of the frame, is drawn up and strikes one end of a lever K, pivotally fulcrumed to that part of the frame supporting the indicating-disk. As this lever K is raised it comes in contact with the spider $F^4$ on the lower end of the rod $F^3$ depending from the indicating-disk and elevates said rod and disk against the pressure of the coil-spring $F^5$, which holds the disk in gear with the cone-clutch. By this means the disk is permitted to turn freely and may be swung back to the zero-point by hand, though of course this may be accomplished automatically by means of a friction-spring similar to that employed in turning the recording-wheels. On the lower side of the disk is a stop-lug $F^6$, adapted to swing against a dog $F^7$, pivoted to the frame and retained in obstructing position by means of a tension-spring $F^8$. Should the disk in moving forward be rotated more than one complete revolution the stop-lug $F^6$ will strike against the upper end of the dog $F^7$ and brush it forward and out of the way, the tension-spring yielding sufficiently for that purpose. When, however, the disk is swung backward to bring the zero-point opposite the index-finger G, the stop-lug will strike against the dog, which latter is rigidly held against movement in a reverse direction by reason of its bearing against the frame. The scale on the periphery of the indicating-disk is so adjusted that the zero-point will be opposite the index-finger when the stop-plug comes in contact with the dog.

Simultaneously with the release of the indicating-disk by means of the horizontal lever K referred to the said horizontal lever operates a crank-arm K', pivoted to a projection on the bracket supporting the indicating-disk. This crank-arm K' at its free end bears against the inner side of a knob $A^6$ on the end of a rod $A^7$, slidably fitting into the outer end of the main shaft A'. Said main shaft A' is slotted in the vicinity of the cone-clutch $A^4$, which normally operates the cam-disks $A^2$ $A^3$, and through this slot is passed a pin $A^8$, uniting the inner member of the cone-clutch to the rod. A compression-spring $A^9$, surrounding the main shaft and bearing against the inner member of the clutch and the worm $A^5$, which is rigidly secured to the shaft, tends to hold the said inner member in frictional and operative engagement with the cams $A^2$ $A^3$, so that the rotation of the shaft will cause the rotation of the said cams.

When the rod $A^7$ is pulled outward by the motion of the crank-arm K', the inner member of the clutch is pulled out of engagement against the pressure of the coil-spring referred to and the cam-disks are thus left free to turn loosely on the main shaft. In order to automatically return the cams $A^2$ $A^3$ to the zero-point, I have provided them at one end with a spring-barrel $A^{10}$, (shown in Fig. 4,) in which the inner end of the spring is secured to a fixed sleeve $D^5$, while the outer end has close frictional contact with the inner wall of the spring-drum. Said drum has on its periphery a stop $A^{11}$, (shown in Figs. 2 and 4,) so positioned as to come in contact with a pivoted dog $A^{12}$, arranged as to allow the stop on the drum to pass by going one direction and to be caught and held at the zero-point on the reverse movement. Fixed to the frame and overhanging the spring-barrel is a retaining-bracket $D^6$, having a depending finger $D^7$, fitting into a peripheral groove $A^{13}$ of the spring-barrel, thus holding the latter, together with the cams fixed thereto, against longitudinal movement when the inner member of the cone-clutch is drawn outward, but allowing said barrel to have a free rotation at all times. By this arrangement it will be seen that immediately upon the release of the cam mechanism from the friction-clutch the spring-barrel will swing the cams back to zero position, being stopped automatically in such position by the dogs mentioned.

Certain parts of the mechanism—such as the usual nuts, bolts, and stop-collars—I do not think it necessary to describe, since the structure and arrangement of parts is obvious from the drawings, and these are of the ordinary conventional type.

By means of the machine which I have just described it will be seen that I am enabled to measure a fabric of any length without placing any indicating-mark thereon. The end of the measured piece of goods may now be inserted beneath the stamping-platen and above the marking-ribbon and the platen thereupon depressed by hand, and this action does not change the position of the printing-wheels. Therefore a duplicate of the indicated measurement may be printed on a card to be attached to the piece, and this card will serve as a tally or check on the amount of the goods sold from that piece. After such marking the recording and indicating mechanism may be returned to their zero position and the measurements begun afresh.

Having thus described my invention, I claim—

1. A fabric measuring and marking machine comprising a rotating member adapted to be moved relatively to the face of the fabric so as to serve as a unit of measure, a shaft fixed to said measuring-unit member and arranged to be rotated therewith, cam mechanism carried by said shaft and connections between the shaft and the cam mechanism adapted to secure rotation of the latter with the former, recording devices, connections between the cam mechanism and the recording devices whereby the motion of the cam mechanism is adapted to advance said recording devices, means for retaining the recording devices in their advanced position and means adapted to disconnect the said cam mechanism from said shaft and release the retaining means of the recording devices and permit the latter to be returned to their initial position, retracting means adapted to return the cam mechanism to its initial position and detents arranged to arrest the cam mechanism and recording devices at such initial positions.

2. A fabric-measuring machine comprising a member adapted to be moved relatively to the fabric so as to serve as a unit of measure, a shaft so connected with said measuring-unit member as to be rotated by the said relative movement thereof, cam mechanism connected with and operated by said shaft, a series of recording-wheels comprising a fraction-wheel and one or more integer-wheels, pawl-and-ratchet connections so arranged that the said wheels may be advanced by the motion of the cam mechanism, the advancing connections of the fraction-wheel being separate from and independent of those belonging to the integer-wheels, separate retaining devices adapted to hold each wheel in its advanced position, separate means for releasing the pawl-and-ratchet mechanism and retaining devices of each wheel, and a movable element adapted to simultaneously actuate each of said separate releasing devices.

3. A fabric-measuring machine comprising a movable measuring-unit member, a shaft so connected as to be rotated by the motion of said measuring unit, an indicating device, connections between said shaft and said indicating device whereby the motion of the former will be transmitted to the latter, cam mechanism connected with the shaft and adapted to be moved thereby, recording mechanism so connected with the cam mechanism as to be advanced by the motion of the latter, and means for simultaneously releasing the indicating mechanism, the cam mechanism and the recording devices from their several connections whereby they may be each returned to their initial position.

4. A fabric-measuring machine comprising a movable measuring-unit member, a shaft connected therewith and adapted to be rotated by the motion thereof, an indicating device connected with said shaft and adapted to be advanced thereby, a plurality of cam-surfaces connected with said shaft, a series of recording devices mounted on the machine-frame, connections between certain of the recording devices and certain of the cam-surfaces whereby the motion of the latter actuates the former and independent connections between certain other of the recording devices and certain other of the cam surfaces, separate retaining devices for each of said recording devices, a rotatable shaft journaled adjacent to said recording devices, tripping members adapted to be advanced against said retaining devices and release the same, and means carried by said rotatable shaft adapted to advance said tripping means when said shaft is rotated.

5. A fabric-measuring machine comprising a measuring-unit member, a series of recording devices, pawl-and-ratchet mechanism for advancing the same and connections between the measuring-unit element and the pawl-and-ratchet mechanism whereby the latter will be operated upon the motion of the former, said recording devices being so mounted that they are capable of movement in a reverse direction so as to return to their initial position, detents arranged to oppose such reverse movement, tripping means adapted to be moved against the detents and throw them out of operation, tripping means adapted to be moved against the pawl connections so as to trip said pawls clear of the ratchets, a rotatable shaft journaled adjacent to said tripping devices, and provided with projections rigidly connected therewith adapted to advance said tripping means upon the rotation of said shaft.

6. A fabric-measuring machine comprising a member adapted to be moved relatively to the fabric so as to serve as a unit of measure, a hollow-ended shaft connected with said measuring-unit member so as to be rotated by the movement thereof, a worm carried by said shaft, a worm-wheel journaled in a bracket on the machine-frame and meshing with said worm, an indicating-disk supported by and having a cone-clutch connection with said worm-wheel, cam mechanism loosely mounted on said shaft, a cone-clutch mounted on said shaft and adapted to coöperate with a member on the cam mechanism and to transfer rotary motion to the latter, a spring interposed between the worm fixed to the shaft and the last-mentioned cone-clutch and adapted to maintain the latter in engagement with the said member of the cam mechanism, a rod mounted in the hollow end of said shaft, a key passing through a slot in the shaft and connecting the cone-clutch with the said rod, a hand-lever secured to the framework of the machine, and connecting mechanism adapted upon the movement of the hand-lever to throw the indicating-disk out of engagement with the clutch carried by the worm-wheel and to retract the rod carried in the hollow shaft so as to release the clutch operating the cam mechanism.

7. A fabric measuring and marking machine comprising a movable measuring unit, a shaft connected with said unit and adapted to be rotated by the movement thereof, cams carried by said shaft and connected therewith, sliding arms mounted on a shaft projecting from the frame, springs connected with said sliding arms in such manner as to cause their inner ends to normally bear against the cam-surfaces, each of said sliding arms being pivotally connected at its outer end to a rocking lever, the rocking levers carrying pivotally-supported pawls, recording-wheels having secured thereto ratchets and mounted on a shaft in such manner that the said pawls may engage said ratchets, spring-pressed dogs mounted on the frame and positioned to engage such ratchets, a plate slidably mounted in the frame behind said dogs and provided with lugs adapted to trip the dogs when the plate is advanced toward the same, and means for advancing said sliding plate.

8. A fabric measuring and marking machine comprising a measuring-unit member, a shaft connected therewith and adapted to be rotated by the movement thereof, cams loosely mounted on said shaft and connected therewith by means of a cone-clutch, a compression-spring mounted on the shaft and adapted to hold said clutch in gear, a sliding rod connected with said clutch whereby the latter may be thrown out of gear upon the reciprocation of the rod against the force of the spring, recording-wheels mounted on a shaft carried by the frame, ratchets fixed to said recording-wheels, pawls adapted to coöperate with said ratchets, lever connections between said pawls and the cam-surfaces whereby the rotation of the latter serves to advance the recording-wheels, spring-pressed dogs mounted so as to engage said ratchets thereby preventing backward movement on the part of the recording-wheels, tripping means for said dogs, a hand-lever mounted on the machine-frame, and connections between said hand-lever, the sliding rod to which the cone-clutch is attached, and the means for tripping the said retaining-dogs whereby, through movement of the hand-lever, the said clutch is thrown out of gear and the said dogs are tripped.

In testimony whereof I hereunto affix my signature in the presence of two witnesses.

ANDREW H. SUTTON.

Witnesses:
CHRISTIAN MEYER,
REGINALD YOUNG.

Correction in Letters Patent No. 842,435.

It is hereby certified that the name of the assignee in Letters Patent No. 842,435, granted January 29, 1907, upon the application of Andrew H. Sutton, of New York, N. Y., for an improvement in "Machinery for Measuring and Marking Fabrics," was erroneously written and printed "Parker and Woolson Machine Company," whereas the said name should have been written and printed *Parks and Woolson Machine Company;*" and that the said Letters Patent should be read with this correction therein that the same may conform to the record of the case in the Patent Office.

Signed and sealed this 19th day of February, A. D., 1907.

[SEAL.]

F. I. ALLEN,
*Commissioner of Patents.*